United States Patent [19]

Röss et al.

[11] 4,336,997

[45] Jun. 29, 1982

[54] CHANGE OF DISTANCE MEASURING APPARATUS

[75] Inventors: Dieter Röss, Planegg; Viktor Baumgartner, Taufkirchen, both of Fed. Rep. of Germany

[73] Assignee: Erwin Sick GmbH Optik-Electronik, Waldkirch, Fed. Rep. of Germany

[21] Appl. No.: 125,209

[22] Filed: Feb. 27, 1980

[30] Foreign Application Priority Data

Mar. 6, 1979 [DE] Fed. Rep. of Germany ....... 2908757

[51] Int. Cl.³ .......................... G01C 3/08; G01B 11/30
[52] U.S. Cl. ...................................... 356/4; 250/201; 356/5; 356/371
[58] Field of Search ........................ 356/4, 5, 4.5, 371; 250/201; 354/25

[56] References Cited

U.S. PATENT DOCUMENTS

| | | | |
|---|---|---|---|
| 3,305,691 | 2/1967 | Hock | 250/201 |
| 3,542,472 | 11/1970 | Vaniz | 356/4 |
| 3,555,280 | 1/1971 | Richards, Jr. | 250/201 |
| 3,565,568 | 2/1971 | Hock | 356/369 |
| 3,715,165 | 2/1973 | Smith | 356/376 |
| 3,768,910 | 10/1973 | Zanoni | 356/5 |
| 3,847,485 | 11/1974 | Zanoni | 356/5 |
| 3,912,922 | 10/1975 | Lacotte et al. | 250/201 |
| 3,945,729 | 3/1976 | Rosen | 356/5 |
| 3,994,589 | 11/1976 | Nodwell et al. | 356/373 |
| 4,004,852 | 1/1977 | Pentecost | 356/4 |
| 4,027,970 | 6/1977 | Miser | 356/4 |
| 4,110,607 | 8/1978 | Honjo et al. | 250/201 |
| 4,160,599 | 7/1979 | Sperrazza | 356/381 |

FOREIGN PATENT DOCUMENTS

| | | |
|---|---|---|
| 1080314 | 4/1960 | Fed. Rep. of Germany . |
| 1761416 | 7/1971 | Fed. Rep. of Germany . |
| 1673927 | 8/1971 | Fed. Rep. of Germany . |
| 2508836 | 9/1976 | Fed. Rep. of Germany . |
| 2553691 | 7/1977 | Fed. Rep. of Germany . |
| 1469533 | 2/1967 | France . |
| 2073246 | 10/1971 | France . |
| 1605232 | 8/1973 | France . |
| 2374652 | 12/1976 | France . |
| 1484996 | 9/1977 | United Kingdom . |

OTHER PUBLICATIONS

"Laser Sensors for Industry", Alta Frequenza, vol. 41, No. 10, Oct. 1972.

Primary Examiner—S. C. Buczinski

[57] ABSTRACT

Change of distance measuring apparatus features a light transmitter - receiver unit 23 which is used to sense the distance A to the surface of a measurement object 35 and more particularly to sense changes in the distance A occurring due to changes in thickness of the measurement object 35 as it moves against a guide surface in the direction of the arrow F. The optical system features a front objective 14 which focuses a parallel beam of light received from a laser light source via beam widening optics 13', 13'', a modal aperture 12 for limiting the beam to the zero order diffraction image of the laser light source and a beam dividing mirror 33. Light returned from the surface of the measurement object whether specularly reflected or scattered is gathered by the front objective 14 and is passed to a photoelectric converter 19 via the dividing mirror 33, a further objective 16 and a second modal aperture stop 18. The signal at the photoelectric converter 19 is a maximum when the surface of the measurement object 35 is located in the desired plane 15. The position of the desired plane can be adjusted by optical means such as moving the front lens 14 and the extent of the movement required to maximize the signal at the photoelectric converter 19 is indicative of the change in the distance A. Various useful modifications are disclosed including the use of a comparison beam 36.

14 Claims, 4 Drawing Figures

FIG.1
FIG.2
FIG.3
FIG.4
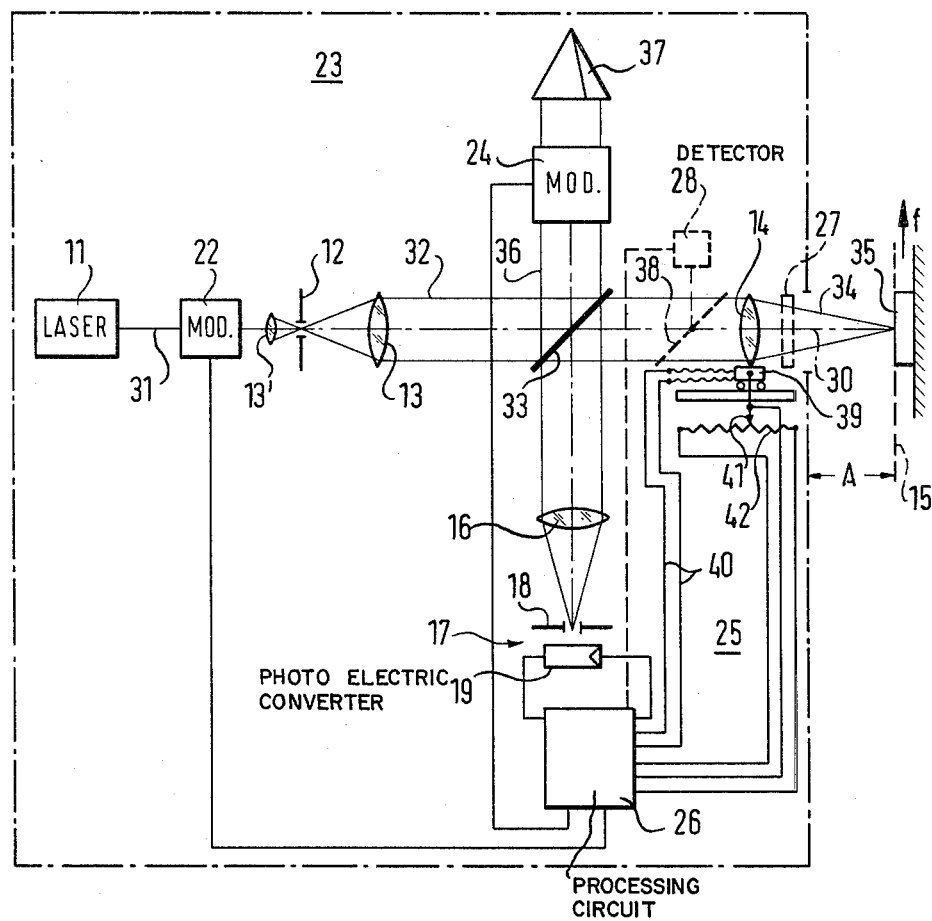
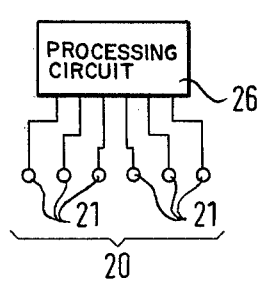
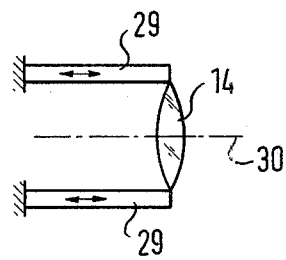
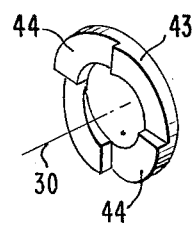

4,336,997

CHANGE OF DISTANCE MEASURING APPARATUS

The invention relates to a change of distance measuring apparatus with a light transmitter-receiver which directs a light beam to a desired plane spaced apart from the light transmitter-receiver and located at or in the vicinity of an object plane the distance of which from the light transmitter-receiver is to be determined and which receives light reflected from the object and evaluates the same by means of a photoelectric converter.

It is known that distances can be interferometrically measured to within a fraction of a micron. Interferometer are however too sensitive for applications such as the continous measurement of the thickness of sheet metal in rolling mills. Moreover interferometer require specularly reflecting surfaces so that special pretreatments of the surface would be necessary when measuring the distance to diffuse reflecting surfaces.

Thickness variations of less than 4 microns can only be measured with the most extreme difficulty and considerable trouble and expense using purely mechanical probes.

The principal object underlying the present invention is to provide a change of distance measuring apparatus in which distance changes, i.e. also changes in thickness, in particular of sheet metal in rolling mills can be detected with high accuracy and in which the spacing of the optical measuring head from the object can be very large in relation to the size of the change in spacing. In particular one would like to be able to detect distance variations of 1 micron and less reliably and without problem by means of the measuring apparatus of the invention.

In order to accomplish this object the invention envisages change of distance measuring apparatus of the kind set out in the introductory paragraph and in which one of a mode limited laser and a modal aperture stop illuminated by the diffraction image of a laser is provided in the transmitter part and is imaged in the desired plane via a lens system and that the desired plane is imaged via an associated lens system onto a photoelectric converter arrangement with an aperture stop which limits the light flux which passes to the photoelectric converter.

The photoelectric converter arrangement should in particular include a second modal aperture stop with the said photoelectric converter arranged therebehind. The second modal aperture stop is preferably an image of the first modal aperture stop and indeed particularly when the object plane is specularly reflecting.

The construction can however also preferably be such that the photoelectric converter arrangement includes a linear diode array which is connected to an electronic processing circuit in which the diodes are sensed one after the other and the measurement signal and the total remission signal are determined from the signal sequence won by sensing said diodes. This construction corresponds to a periodic linear scanning of the light intensity within a gap formed by the diode array. The center of the intensity distribution can be determined in the electronic processing circuit via the flanks of the intensity distribution which is in particular a gauss distribution. This embodiment has the advantage that the extremely exact initial adjustment of the second modal aperture stop can be avoided because the spatial position of the diode array in its longitudinal direction is not critical.

Thus, in accordance with the invention, a well defined light beam, in the ideal case, a diffraction limited light beam, is generated by means of one or two modal aperture stops. Preferably the modal aperture stops separate out solely the zero order of the diffraction patterns present thereon. The imaging lenses that are used must be of a relatively high quality, i.e. corrected. The lenses have a relatively large aperture.

If the imaging lens which concentrates the light beam on the object to be measured has an aperture A then it generates at the focal point, i.e. at the desired plane a focal bead with a radius $1.22\lambda/A$.

If the object to be measured scatters light and is located at the desired plane then the light which leaves the measuring object and which passes through the pupil of the last imaging lens is also diffraction limited and can pass completely through the second diffraction limiting modal aperture stop to the photoelectric converter. If the (scattering) object to be measured is in contrast located outside of the desired plane then the focal bead is enlarged and the scattered light is no longer diffraction limited. The beam flux through the second modal aperture stop is accordingly reduced and indeed approximately quadratically in relation to the spacing of the object plane, i.e. the surface of the body to be measured, from the desired plane.

If the measuring arrangement in accordance with the invention is first of all initially adjusted so that a specified beam flux is registered by the photoelectric converter on the presence of a specified object of desired thickness, for example sheet metal in a rolling mill then thickness variations will produce corresponding signal variations at the output of an electronic processing circuit. The zero position can be so chosen that a clear relationship results between the thickness of the material and the signal (bias).

The transmitted light is advantageously modulated by a modulator. In this way not only can the affects of ambient light be excluded but it is also possible to affect an electronic separation of the measuring light and the comparison light. In this arrangement the comparison light can be generated by branching off a part of the transmitted light in the light transmitter-receiver and passing it directly to the photoelectric converter arrangement via a second modulator. By the use of different frequencies for the two modulators the signals generated by the light beams which pass through the modulators can be electrically separated. It is also possible to so arrange the modulators in the measurement and comparison light beams that the measurement and comparison light beams are alternately sensed.

It is particularly advantageous if the spacing of the desired plane from the light transmitter receiver is variable. The change can take place by optical means, for example a plane parallel plate introduced into the convergent beam path or also by displacement of the imaging lens, and in particular the front lens, along the optical axis. In this manner the desired plane can be brought into correspondence with the object plane which forms the surface of the measurement object. This can for example take place at the start of the measurement. Deviations of the object plane from the desired plane then result in corresponding signal changes at the output of the photoelectric converter or the electronic processing circuit which is connected thereto.

In accordance with a preferred embodiment a control circuit is provided which automatically regulates (feed back regulates) the desired plane into position in a prevailing object plane. In this embodiment the desired plane is automatically guided back to the object plane. The extent of the guidance back to the object plane can then be used in the customary manner as a measure for the deviation of the distance of the object to be measured from the light transmitter-receiver.

It is particularly advantageous if the position of the desired plane is periodically varied and indeed preferably so quickly that the frequency with which the desired plane is periodically displaced is large relative to the frequency of occurrence of thickness variations of the detected rolled sheet metal. In this way a continuous control is possible of the zero point in the processing circuit. The continous change of the desired plane can preferably take place by a modulation of the focal length of the front lens which can for example take place by means of a plane parallel plate of changing thickness. This can be an optical part which is periodically introduced into the convergent part of the beam path or also a rotating plane parallel plate which has wedge-like changing thickness over its periphery. The focal length of the front lens is modulated in the desired manner by quickly rotating the plate.

In accordance with a preferred and particularly practical embodiment the frequency signal resulting from the periodic change is evaluated in the processing circuit with reference to the phase position of the maximum and this phase position is used as a measure for the location of the object plane. Namely, as soon as the desired plane, during its periodic displacement at right angles to its plane, coincides with the object plane the electrical signal at the output of the photoelectric converter reaches a maximum.

In accordance with a further advantageous embodiment the regulating circuit includes a very sensitive flank detector arranged at the location of the second modal aperture stop which flank detector is controlled (feed back controlled) to constant gradients.

The periodic change of the position of the desired plane can take place by attaching the imaging lens (front lens) to a mechanical, piezoelectric or magnetoconstrictive oscillator or also by the arrangement of a rotating transparent plate of changing thickness.

Monitoring of the total remission is possible in simple manner if an areal arrangement (for example a detector cell) is used as the detector and registers the total light flux alongside the signal in the measuring channel.

The sensitivity of the measurement can be increased by modulation of the measuring beam and by noise suppressing signal evaluation process (Filter, Phase-Locked-Loop).

Thickness variations of non-transparent, reflecting and scattering bodies can be measured with the previously described embodiment providing the rear side of the measuring object has a well defined position by the use of an exact guide as it passes by the apparatus of the invention.

The thought underlying the invention can however also be used for measuring the thickness of transparent bodies. For this purpose a scattering or reflecting surface is provided in the vicinity of the desired plane and the transparent foil or plate the thickness of which is to be specified is brought between the front lens and the scattering or reflecting surface. It is essential that the foil is located in the convergent part of the beam path.

If the foil or transparent plate has a thickness d and a refractive index n then the light path will apparently be increased by the amount $d(n-1)$.

The invention will now be particularly described by way of example only and with reference to the accompanying drawings in which are shown:

FIG. 1: a schematic illustration of a change of distance measuring apparatus in accordance with the invention, FIG. 2: a schematic view of a linear diode array as can be used with the measuring apparatus of FIG. 1 and FIG. 3: the preferred linearly oscillating arrangement of the front lens as it is used in the measuring arrangement of FIG. 1.

FIG. 4: a perspective view of means for varying the focal length of the front lens.

Referring firstly to FIG. 1 a laser 11 transmits a sharply defined monochromatic light beam 31 through a modulator 22 to a beam widening lens arrangement 13, 13'. Between the microobjective 13', which has the relatively smaller aperture, and the objective 13, which has the relatively larger aperture, there is located, in accordance with the invention, a first modal aperture stop 12 at the position where the microobjective 13' forms an image of the laser light source 11. The modal aperture stop 12 preferably selects out only the zero order of the diffraction image of the laser light source 11. Thus from the objective 13, at the focal point of which there is located the modal aperture stop 12, there emerges a diffraction limited parallel light beam 32 which passes through a beam dividing mirror 33 to a front objective 14 located at the outlet of the light transmitter-receiver 23. The now converging light beam 34 emerges from the apparatus via the front objective 14 and is focussed at the desired plane 15 which is indicated in broken lines. The surface of a measurement object 35 whose distance A from the light transmitter-receiver is to be determined and which is also designated as the object plane is located in the desired plane 15.

The light which is specularly reflected or scattered at the surface of the measurement object 35 is once more received by the front objective 14 and is deflected via the beam dividing mirror 33 to a receiving objective 16 which focusses the parallel light beam at a second modal aperture stop 18. The second modal aperture stop 18, particularly in the case of specular reflection of the surface of the measurement object 35, is an exact image of the first modal aperture stop 12. The second modal aperture stop 18 thus preferably likewise only allows the zero order of the diffraction image of the light source which is developed at the second modal aperture stop to pass. The second modal aperture stop 18 and a photoelectric converter 19 arranged therebehind together form a photoelectric detector arrangement 17. The photoelectric converter 19 is applied to an electronic processing circuit 26 to which the modulation signals from the two modulators 22 and 24 are also passed.

The modulator 24 is located in a comparison beam path which is likewise branched off through the beam divider 33 in the manner which can be seen from FIG. 1. The comparison beam 36 is reflected back on itself at a retroreflector 37 and likewise reaches the photoelectric converter arrangement 17 through the beam dividing mirror 33 and the receiving objective 16. The electrical signal originating from the measurement object 35 and from the comparison beam 36 can be separated in the processing circuit 26 by corresponding sensing, or frequency differences, of the the modulators 22, 24.

A part of the received light can also be deflected to a detector arrangement 28 of large area via a further beam divider 38 which is arranged in the received light beam which is illustrated in broken lines in FIG. 1. The large area detector arrangement 28 is connected with the processing circuit 26 in the manner likewise indicated in broken lines and delivers a measure for the total remission of the surface of the measurement object 35. In this way a reference signal corresponding to the total remission of the measurement object 35 is available in the processing circuit 26.

The front lens 14 is preferably linearly displaceable in the direction of the optical axis 30 as seen in FIG. 1. This is indicated by the illustration of the front lens 14 as being mounted on a carriage 39. A drive motor in the carriage 39 is connected via lines 40 with the processing circuit 26. The carriage 39 also carries the tap 41 of a potentiometer 42 which is likewise connected to the processing circuit 26. The carriage 39 with its drive motor, the potentiometer 42, the processing circuit 26 and the photoelectric converter arrangement 17 with the associated optical elements together form a regulating circuit 25 (feed back controlled) which can be so tuned that the front lens 14 automatically displaces itself until its focal point or the desired plane 15 coincide with the surface or the object plane of the measurement object 35. The position of the focal point of the front lens or measuring optics 14 is thus continuously mechanically adjusted. If thickness variations of the measurement object 35, which should be imagined in the form of a metal sheet in a rolling mill moving past the apparatus in the direction of the arrow F, do not occur too quickly then it is preferred to hold the focal bead constantly on the measuring object 35 by adjustment of the front lens 14. In this case a very sensitive flank detector can be controlled to constant gradients at the modal aperture stop 18. A high frequency oscillation of the front lens 14 in the direction of its optical axis 30 can be simultaneously superimposed on this slower adjustment movement.

This can for example take place in the manner which can be seen from FIG. 3 in which the lens frame is suspended on piezoelectric or magnetoconstrictive oscillators 29 which are excited to a high frequency mechanical oscillation in the direction of the optical axis 30. The front lens 14 and the desired plane 15 oscillate correspondingly and continuously in the direction of the optical axis 30 about the null position. The surface noise can be specifically eliminated in combination with a suitable electrical evaluation in the processing circuit 26 (for example integral with various time constants). It is however particularly advantageous that this measure enables the high frequency oscillating desired plane 15 to continuously detect the surface of the measurement object 35 so that the prevailing exact position of the surface of the measurement object 35 and thus indirectly also the thickness of the measurement object 35 can be exactly detected by suitable electronic evaluation in the circuit 26 even during slow changes of spacing of the objective 14.

The oscillating arrangement of the front lens 14 can also be used without the slower adjustment movement if it can be expected that the surface of the measurement object whose distance A from the light transmitter-receiver is to be determined will be located within a region which is smaller than the amplitude of oscillation of the front lens 14.

The distance A of the desired plane 15 from the light transmitter-receiver 23 can also be changed by introducing a plane parallel plate 27 into the convergent part of the measurement beam path as illustrated in broken lines. A linear diode array 20, as seen in FIG. 2, can also be arranged in the image plane of the desired plane 15 in place of the second modal aperture stop 18 and the photoelectric converter 19. The diodes 21 are connected to the processing circuit 26 which periodically scans the diodes 21 one after the other. The instantaneously prevailing maximum of the light intensity inside of the diode array 20 can be determined in the processing circuit 26. Moreover by these means the total reflection (total remission) can be drawn on as a measuring signal. By suitable evaluation the total remission signal and the measurement signal are thus simultaneously produced. In this case the reference beam path realized by way of the partially transmitting mirror 38 and the detector arrangement 28 are unnecessary.

As mentioned above, the continous change of the desired plane can preferably take place by modulation of the focal length of the front lens which can for example take place by means of a plane parallel plate of changing thickness. This can be an optical part which is periodically introduced into the convergent part of the beam path or also a rotating plane parallel plate 43 which has wedge-like sections changing thickness over its periphery (FIG. 4). The focal length of the front lens is modulated in the desired manner by quickly rotating the plate 43. Plate 43 would be arranged where plate 27 is shown in FIG. 1.

It is important that the extent of the diodes 21 of the diode array 20 in the direction transverse to the longitudinal direction correspond approximately to the extent of the opening of the modal aperture stop 18. Those ones of the diodes which receive the strongest light intensity correspond to the location of the aperture of the modal aperture stop 18. The signals from these diodes are correspondingly used in the evaluation.

We claim:

1. Change of distance measuring apparatus for measuring the change of a distance from a datum to a surface, the apparatus comprising a monochromatic laser light source for generating a laser light beam, means limiting the laser light beam emitted from said source to the zero order diffraction beam, beam widening means for spreading the zero order diffraction beam into a parallel beam of light, a front objective positioned to receive said parallel beam of light and to bring the same to a point focus, adjusting means for adjusting the position of said point focus to bring the same into substantial coincidence with said surface without varying the parallelism of said parallel beam of light, means for producing high frequency cyclical variation of the position of said point focus without disturbing the parallelism of said beam of light, beam dividing means located in said parallel beam of light between said beam widening means and said front objective, said beam dividing means being adapted to pass at least a fraction of said parallel beam of light to said objective and to direct light returned through said front objective from said surface to a second objective, means defining a modal aperture stop at the focal plane of said second objective which allows only a zero order diffraction image of the light source to pass, photoelectric converter means positioned to receive light from said zero order diffraction image and an electronic processing circuit for processing signals derived from said photoelectric converter means to produce a control signal for said adjusting means to bring said point focus into substantial coincidence with said surface.

2. Apparatus according to claim 1 and wherein said laser light source comprises a mode limited laser which incorporates said means for limiting the laser light beam emitted from said source to the zero order diffraction beam.

3. Apparatus according to claim 1 and wherein said means for limiting the laser light beam emitted from said source to the zero order diffraction beam comprises a modal aperture stop illuminated by a diffraction image of said laser.

4. Apparatus according to claim 3 wherein said modal aperture stop at the focal plane of said second objective is an exact image of said modal aperture stop for limiting the laser light emitted from said light source to the zero order diffraction beam.

5. Apparatus according to claim 1 and wherein the photoelectric converter means comprises a linear diode array.

6. Apparatus according to claim 1 and wherein said adjusting means comprises plane parallel plate means introduced between said front objective and said point focus.

7. Apparatus according to claim 1 and wherein said adjustment means comprises means for adjusting the position of said front objective.

8. Apparatus according to claim 1 and wherein a high frequency oscillating signal developed at said photoelectric converter means as a result of said cyclical variation of the position of said point focus is evaluated in said processing circuit with reference to the phase position of the maximum and this phase position is used to form said control signal.

9. Apparatus according to claim 8 and wherein said processing circuit includes a very sensitive flank detector.

10. Apparatus according to claim 1 and wherein said means for producing high frequency cyclical variation of the position of said point focus comprises means for cyclically moving said front objective.

11. Apparatus according to claim 10 and wherein said means for cyclically moving said front objective comprises a mechanical, piezoelectric or magnetoconstrictive oscillator.

12. Apparatus according to claim 1 and wherein said means for producing high frequency cyclical variation of the position of said point focus comprises a rotatable transparent plate of changing thickness disposed between said front objective and said point focus.

13. Change of distance measuring apparatus for measuring the change of a distance from a datum to a surface, the apparatus comprising a monochromatic laser light source for generating a laser light beam, means limiting the laser light beam emitted from said source to the zero order diffraction beam, beam widening means for spreading the zero order diffraction beam into a parallel beam of light, a front objective positioned to receive said parallel beam of light and to bring the same to a point focus, adjusting means for adjusting the position of said point focus to bring the same into substantial coincidence with said surface without varying the parallelism of said parallel beam of light, means for producing high frequency cyclical variation of the position of said point focus without disturbing the parallelism of said beam of light, beam dividing means located in said parallel beam of light between said beam widening means and said front objective, said beam dividing means being adapted to pass at least a fraction of said parallel beam of light to said objective and to direct light returned through said front objective from said surface to a second objective, means defining a modal aperture stop at the focal plane of said second objective which allows only a zero order diffraction image of the light source to pass, photoelectric converter means positioned to receive light from said zero order diffraction image and an electronic processing circuit for processing signals derived from said photoelectric converter means to produce a control signal for said adjusting means to bring said point focus into substantial coincidence with said surface and wherein a first modulator is provided for modulating said laser light beam.

14. Apparatus according to claim 13 wherein means are provided for directing a part of said parallel light beam to a second modulator, and wherein, after modulation by said second modulator, said part of said parallel light beam is passed to said photoelectric converter means.

* * * * *